Nov. 3, 1936.  G. J. FARNWORTH  2,059,783

METHOD OF COATING COMPOSITE ARTICLES

Filed July 2, 1932

INVENTOR
GEORGE J. FARNWORTH
BY
John P. Tarbox
ATTORNEY

Patented Nov. 3, 1936

2,059,783

UNITED STATES PATENT OFFICE 2,059,783

METHOD OF COATING COMPOSITE ARTICLES

George J. Farnworth, Detroit, Mich., assignor to Budd Wheel Company, Philadelphia, Pa., a corporation of Pennsylvania Application July 2, 1932, Serial No. 620,719

5 Claims. (Cl. 148—6.5)

The invention relates to articles of manufacture, and to the method of coating them, and particularly to composite articles including component elements of different metals and to a method of selectively coating one of the elements.

More specifically, and as an example of a preferred device for which the method is particularly adapted, a vehicle wheel of the artillery type is constructed of obverse and reverse component substantially half sections, divided on a plane parallel to the load-plane of the wheel; it being desired to coat only one of the component sections, but not until after the sections have been permanently secured to each other, for reasons which will hereinafter more fully appear.

One object of the invention is to provide a better composite structure, of the above-indicated type, and a more effective method of selectively rendering the surfaces of its component sections of different character.

Another object of the invention is to provide a composite structure, including component elements of different metals, that shall be simple and durable in construction, economical to manufacture and effective in its operation.

With such objects in view, as well as other advantages which may be incident to the utilization of the improvement, the invention consists in the parts and combinations thereof hereinafter set forth and claimed, with the understanding that the several necessary elements constituting the same may be varied in proportion, arrangement and texture without departing from the nature and scope of the invention.

In a vehicle wheel, since only the outer side is normally visible to the casual observer, only this side is required to be of ornate character. This fact has heretofore suggested, in connection with pressed-metal wheels of the artillery type, that obverse and reverse component spider stampings be of different metals, such as stainless steel and chromium-plated steel, for the obverse stamping, and ordinary carbon steel for the reverse stamping.

The chromium-plated, stainless-steel or other obverse surfaces, being substantially non-oxidizable, require no coating, but the carbon-steel surfaces, being oxidizable in character, are required to be protected. This fact presents the problem which the method solves, where the component sections of such different metals are welded together, as in the structure of my invention.

The invention will be best understood from a consideration of the following description and drawing, in which—

Figure 1:
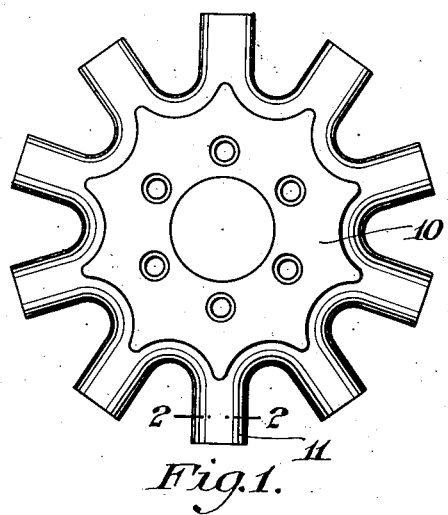
Figure 3:
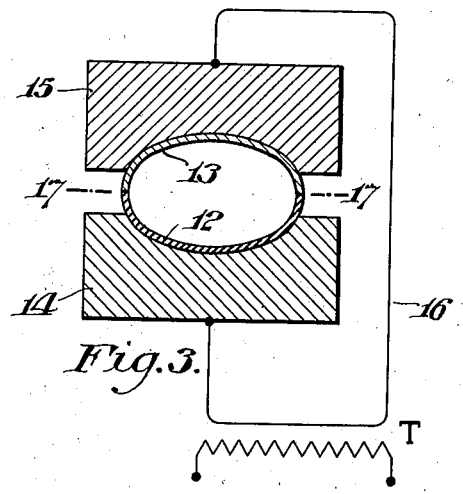
Figure 2:
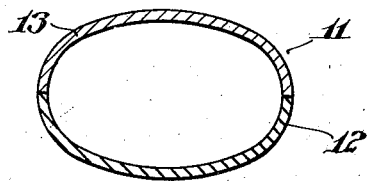
Figure 5:
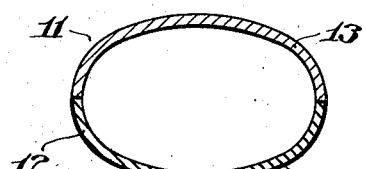
Figure 4:
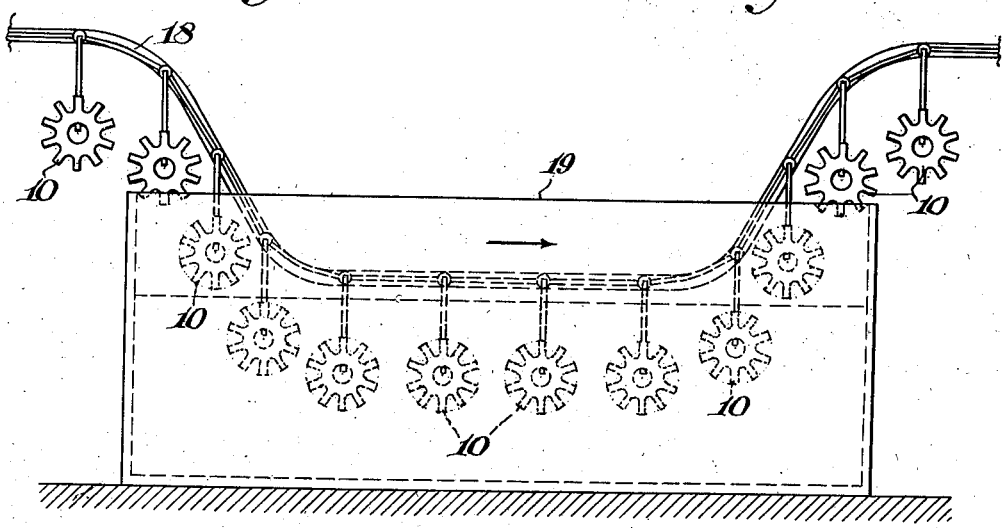

Figure 1 is a view, in front elevation, of a portion of a wheel of my invention, Fig. 2 is a view, in cross section, of a spoke, taken substantially along the line 2—2 of Fig. 1, Fig. 3 is a view, indicating, diagrammatically, the relation of parts and a welding circuit during the assembly of the component parts of an artillery wheel body or spider, Fig. 4 is a diagrammatic side-elevational view of a tank and a monorail conveyor system for cooperation therewith, and Fig. 5 is a view corresponding to Fig. 2, showing the completed composite structure.

The device comprises, in general, a vehicle wheel spider 10, of the composite nature to which my invention is especially applicable, including spokes 11 constituting integral parts of the wheel body and which are welded in the manner shown in Fig. 3. In this figure, the inner half stamping 12, indicated by a section of one of its spoke arms, is welded to the outer half stamping 13, which is similarly indicated, as by electrodes 14 and 15, respectively. The wiring arrangement is indicated by numeral 16, and the letter T, indicating the transformer in the electrical welding circuit.

In Figs. 2, 3 and 5, the member 12 is the inner half of the wheel spider, on that side of the wheel which faces toward the vehicle, and the member 13 is the outer half of the spider. In accordance with a recent trend of the automotive industry toward bright and unpainted metals, such as polished chrome steel, or chromium plated steel, the visible outer half 13 of the wheel spider 10 is constructed of a bright metal.

In order to save a part of the expense which would be entailed in the manufacture of the entire wheel of this material, the inner half 12 of the wheel spider is constructed of ordinary carbon steel, as indicated by the heavy section lines in Figures 2, 3 and 5. The inner half spider is welded to the outer half along a median plane 17, as indicated in Fig. 3.

Inasmuch as the inner half 12 of the spider is fabricated of ordinary carbon steel, it must be treated to render it rust-proof. It is highly desirable to treat this inner half after it is welded to the outer half, by virtue of the fact that the extreme heat and pressure of the welding process has a deleterious effect on the protective coating.

I have found that a rust-proofing solution, which is composed chiefly of phosphoric acid and/or metallic phosphates does not in any way affect chrome steel, commonly known as stainless steel, nor does it affect chromium plated steel. As a result, it is possible to apply the protective coating, after the welding of the parts which form a composite wheel body, or other metallic structure.

In accordance with the preferred embodiment of the invention, the articles are immersed in a suitable solution for a predetermined period of time. The solution may be any rust-proofing type, of which a few examples are commercially known. Any solutions of which phosphoric acid and/or the metallic phosphates are chief constituents, may be used to obtain the desired protective coating on one portion of the composite articles. It is characteristic of these solutions that they are electronegative to chromium, which metal is the most generally used constituent of stainless steels.

The coating thus obtained constitutes the outer rust-proof surface or may be employed as a base for the subsequent application of paint or enamel.

As it is used commercially, the solution for forming the protective coating, is contained in a large metallic tank, which is generally copper-lined, as indicated by a tank 19 in Fig. 4 of the accompanying drawing. The method, as adapted to quantity production, may be practiced by the use of a continuous monorail conveyor system 18, of a well-known commercial type, by which the composite articles are dipped and conveyed slowly through the solution in the tank. The solution, containing phosphoric acid and/or metallic phosphates, is heated to approximately 200–220° Fahrenheit, by either passing live steam through the solution, or by any other suitable expedient. Although it has been determined by test that an immersion of about 10 minutes, in a 210° solution of the coating solution, is very satisfactory, other periods of immersion may be successfully used; the time being in substantially inverse proportion to the temperature of the solution.

The composite articles, are immersed either by hanging on racks, or by passing slowly through the solution on a conveyor system 18, such as that shown.

Relative to the actual physical and chemical change which takes place, it appears that the phosphoric acid in the solution, which is the proximate result of combining the anhydride of phosphorus with water, attacks the surface of carbon steel and deposits on the surface thereof a cohesive bond of protective coating 20, in the form of a copper phosphate. The phosphoric acid, which thus affects carbon steel, has no effect on chrome steels, such as stainless steel, nor on plated steels.

The coating, produced by the above procedure, has been found to be an excellent base for the subsequent application of paint, enamel or other protective coat.

The above-described procedure, constitutes a highly satisfactory method of beneficially treating one of the metal members of a composite metal structure, another member of which is unaffected by the method, and permits the structure to be treated after its complete assembly. The effect of the solution is localized to the area in which carbon steel is disposed, so that a wheel comprising an outer section of stainless steel and an inner section of carbon steel may be assembled completely, and thereafter subjected to immersion in a solution, and only the carbon steel affected. The stainless steel needs no protective coating, such as a phosphate, as it is inherently rust-proof by reason of its chrome content.

A slight sludge, visible only on the stainless-steel member, but also disposed on the carbon-steel member may be removed from both members, as it leaves the tank, by a stream of water under high pressure. This sludge, which is invisible on the carbon steel member because it is the same color as the phosphate coating, includes small loose particles of phosphate which adhere to the stainless steel member, only because of a certain degree of surface adherence, and to the carbon-steel member, by reason of the natural affinity of similar substances.

The sludge is accordingly removed from both members, to clean the stainless-steel member preparatory to polishing and to prepare the carbon steel member for a coating of paint in better attachment to the surface of the hard phosphate.

While I have shown and described a particular form of my invention, changes may be effected therein without departing from the spirit and scope thereof, as set forth in the appended claims.

What I claim is:

1. The method of selectively coating one of the component elements of a composite structure comprising carbon-steel and stainless-steel elements, which comprises subjecting the structure in an aqueous bath to a coating medium consisting of a phosphate of a metal and having substantially no tendency to form an adherent coating with the surface of the stainless steel, while having a strong tendency to form such a coating with the surface of the carbon steel.

2. The method of selectively coating one of the component elements of a composite structure comprising carbon-steel and stainless-steel elements, which comprises subjecting the structure in an aqueous bath to a coating medium comprising a metallic phosphate and free phosphoric acid.

3. The method of coating one of the component elements of a composite structure comprising carbon-steel and stainless-steel elements, which comprises immersing the structure in an aqueous bath containing a metal phosphate and free phosphoric acid, removing the excess deposit from the surface of the carbon-steel portion of the structure after removal from the bath and then applying a final siccative coating to said last named surface.

4. The method of selectively coating the carbon-steel portion of a composite article having another portion of stainless alloyed steel in contact with said first portion which consists in immersing both contacting portions in an aqueous bath containing a metallic phosphate having substantially no tendency to form an adherent coating with the surface of the stainless steel while having a strong tendency to form such a coating with the surface of the carbon steel, removing said article from said bath, removing excess deposits from the surface of the coated carbon-steel portion and then applying a final siccative coating thereon.

5. The method of selectively coating one of the component elements of a composite structure comprising carbon-steel and stainless-steel elements, which comprises immersing said structure in a coating medium of manganese dioxide and phosphoric acid, removing said structure from said medium, removing excess deposits from the surface of the coated carbon-steel element and additionally coating said carbon-steel element.

GEORGE J. FARNWORTH.